(12) United States Patent
Kawashima

(10) Patent No.: US 6,597,766 B1
(45) Date of Patent: Jul. 22, 2003

(54) TELEPHONE APPARATUS

(75) Inventor: Isao Kawashima, Kanagawa (JP)

(73) Assignee: Sony Corporatioin, Tokyo (JP)

( * ) Notice: Subject to any disclaimer, the term of this patent is extended or adjusted under 35 U.S.C. 154(b) by 0 days.

(21) Appl. No.: 09/310,794

(22) Filed: May 12, 1999

(30) Foreign Application Priority Data

May 14, 1998 (JP) .......................................... 10-131719

(51) Int. Cl.[7] .............................................. H04M 1/64
(52) U.S. Cl. ................................ 379/88.23; 379/373.01
(58) Field of Search ............................ 379/67.1, 88.19, 379/88.2, 88.21, 88.22, 88.23, 142.01, 373.01, 373.02

(56) References Cited

U.S. PATENT DOCUMENTS

| 4,734,930 | A | * | 3/1988 | Quiros et al. | |
| 4,908,845 | A | * | 3/1990 | Little | |
| 4,993,060 | A | * | 2/1991 | Kelly | |
| 5,029,198 | A | * | 7/1991 | Walpole et al. | |
| 5,031,205 | A | * | 7/1991 | Phillips | |
| 5,189,692 | A | * | 2/1993 | Ferrara | |
| 5,454,036 | A | * | 9/1995 | Gleeman et al. | ............ 379/392 |
| 5,717,739 | A | * | 2/1998 | Dyer et al. | ................. 379/67.1 |
| 5,745,562 | A | * | 4/1998 | Penning | ........................ 379/215 |
| 5,828,742 | A | * | 10/1998 | Khalid et al. | ................ 379/199 |
| 5,850,435 | A | * | 12/1998 | Devillier | ...................... 379/374 |
| 5,903,628 | A | * | 5/1999 | Brennan | ................... 379/88.21 |

FOREIGN PATENT DOCUMENTS

| GB | 2248154 | * | 3/1992 |
| JP | 62-222751 | | 9/1987 |
| JP | 4-262654 | | 9/1992 |

* cited by examiner

Primary Examiner—Scott L. Weaver
(74) Attorney, Agent, or Firm—Frommer Lawrence & Haug LLP; William S. Frommer; Bruno Polito

(57) ABSTRACT

At the time of call arrival, when the user of a telephone terminal depresses a response key or performs some other tentative responding manipulation instead of lifting up a handset, the telephone terminal transmits a self-introduction request message to the caller. A self-introduction voice transmitted from the caller in response is emitted from a speaker. Listening to the self-introduction voice, the user identifies the caller. If the user wants to talk to the caller, he depresses a communication key or lifts up the handset as a true responding manipulation and then starts a communication with the caller. On the other hand, if the user does not want to talk to the caller, he depresses an automatic answering mode setting key or a disconnection key.

15 Claims, 4 Drawing Sheets

TELEPHONE APPARATUS

BACKGROUND OF THE INVENTION

1. Field of the Invention

The present invention relates to a telephone apparatus.

2. Description of the Related Art

Annoying calls such as a prank call and an undesired sales or solicitation call have been problematic to users, and several measures as described below have been realized or proposed so far.

For example, what is called a caller number notification service is one of services that came to be provided by telephone companies. In this service, a reception-side telephone terminal is informed of the telephone number that is allocated to a calling-side telephone terminal and at the time of call arrival the telephone number of the calling-side telephone terminal is displayed on a display device of the reception-side telephone terminal before the user of the reception-side telephone terminal makes a responding manipulation.

By utilizing this service, the user of a reception-side telephone terminal can not only answer at ease to a call from a person whose telephone number is known to the user but also refrain from answering a call from a person whom the user does not want to talk to, a call from a person whose telephone number is unknown, or a call from a person who has made the call in such a manner that the user is not informed of the telephone number of that person. This service is thus useful for preventing annoying calls.

Japanese Unexamined Patent Publication No. Sho. 62-222751 proposes a telephone terminal having an annoyance preventing function. In the annoyance preventing function proposed in this publication, an automatic response is made at the time of call arrival and an answering message stored in a memory of the telephone terminal is transmitted to the calling side. If the calling side responds to the transmitted answering message, ringing tones are emitted.

That is, the telephone terminal having the annoyance preventing function does not emit ringing tones immediately upon call arrival but do so only when the caller has responded to an answering message, to thereby prevent the user from being called up by a prank call, a wrong-number call, or the like.

Japanese Unexamined Patent Publication No. Hei. 4-262654 proposes a telephone terminal having a prank call repulsing function. The prank call repulsing function proposed in this publication is as follows. When the user has undesirably responded to a prank call, he depresses a prank call repulse button that is provided on the telephone terminal, whereupon a voice of the caller of the prank call is recorded for a predetermined period and the recorded voice is returned to the caller.

The above telephone terminal having the prank call repulsing function is proposed as a method of effectively repulsing a prank call when the user has undesirably responded to it.

Incidentally, in the above-described caller number notification service, according to a contract with a telephone company or by performing a predetermined manipulation in making a call, a call can be made in such a manner that the reception side is not notified of the telephone number that is allocated to the telephone terminal of the caller. In the case of a call that is made from a public telephone, the reception-side telephone terminal is informed that the call is from a public telephone.

Therefore, if a call is made in such a manner that the reception side is not notified of the telephone number of the caller or if a call is made from a public telephone, the user on the reception side is obliged to answer the call in a state that he doesn't know who the caller is. Naturally, as described above, it is possible to refrain from answering such a call. However, the user who keeps such a procedure cannot respond to a call from a person whom the user should talk to such as a call made by his family member or acquaintance by using a public telephone or a telephone terminal with which notification of the telephone number is not made.

In the caller number notification service, as described above, the calling-side telephone number of which the reception-side telephone terminal is informed is the number allocated to the telephone terminal. Therefore, if a call is made by a family member or an acquaintance from a place that is different from the place where he usually makes a call, the user of the reception-side telephone terminal is notified of the telephone number that is allocated to the telephone terminal used but the telephone number is unknown to the user. In this case, the user of the reception-side telephone terminal cannot identify the caller, possibly causing a problem that the user does not respond to a call from a person whom the user should talk to.

As exemplified above, in the caller number notification service, it is impossible for the user on the reception side to recognize a caller without exception based on the caller's telephone number of which the user is notified. Therefore, when a call is made in such a manner that the reception side is not notified of the telephone number, a call is made from a public telephone, or the user of the reception-side telephone terminal is informed of an unknown telephone number, the user may be obliged to answer the call. Annoying calls cannot be prevented completely.

In view of the above, it seems effective to use the telephone terminal having the annoyance preventing function as disclosed in the publication Sho. 62-222751. However, in the telephone terminal having the annoyance preventing function, ringing tomes are emitted when the caller has responded to an answering message even if the call is a prank call, a wrong-number call, or an undesired sales or solicitation call. In this case, the user of the reception-side telephone terminal is obliged to answer in a state that he does not know who the caller is. Annoying calls such as a prank call cannot be prevented completely.

In the telephone terminal having the prank call repulsing function as disclosed in the publication Hei. 4-262654, the user who has undesirably responded to a prank call can repulse it effectively because a voice of the caller of the prank call can be returned to the call as it is. However, the prank call repulsing function is a function that is effective when the user has undesirably responded to a prank call, and does not prevent answering itself to a prank call.

In view of the above, in the case of the telephone terminal having the automatic answering function, it is conceivable to allow the user to identify a caller based on a call content message from the caller by utilizing the automatic answering function and, if the caller is a person whom the user wants to talk to, start talking to the caller by switching from an automatic answering mode to a communication mode by lifting up a handset, for example.

However, the automatic answering function is a function for automatically answering a call and storing a call content message of the caller in a memory, for example, of the telephone terminal. Therefore, even if a caller is identified based on a call content message from the caller and it has been found that the caller is a person whom the user wants to talk to, there may frequently occur events that when switching is made to a communication mode the message from the caller has already been finished and the telephone circuit has been disconnected, in which case the user cannot answer the call and communicate with the caller.

SUMMARY OF THE INVENTION

In view of the above, an object of the present invention is to provide a telephone terminal which can completely prevent answering to annoying calls and surely allows the user to answer a call from a caller whom the user wants to talk to.

The invention provides a telephone apparatus for communicating an information signal via a communication network, the telephone apparatus comprising receiving means for receiving an information signal; transmitting means for transmitting an information signal; informing means for informing a user of reception of connection demanding information when the receiving means receives the connection demanding information from a second telephone apparatus as the information signal; storing means for storing message information; user input means for allowing a user to input an instruction signal; and control means for controlling the transmitting means to transmit, as the information signal, the message information stored in the storing means to the second telephone apparatus in accordance with the instruction signal that is input through the user input means when the informing means informs the user of the reception of the connection demanding information.

The telephone apparatus may be so constructed that it further comprises communication means for performing input and output of communication information for communication with the second telephone apparatus, that the receiving means receives the connection demanding information and the communication information as the information signal, and that the transmitting means transmits at least the communication information as the information signal.

The control means may control the receiving means, the transmitting means, and the communication means based on the instruction signal that has been input by the user, whereby the communication information is communicated between the second telephone terminal and the communication means.

The telephone apparatus may be so constructed that it further comprises a telephone apparatus body and a handset, and that at least the receiving means, the transmitting means, and the control means are accommodated in the telephone apparatus body and the communication means is provided in the handset.

The control means may control the receiving means, the transmitting means, and the communication means when detecting that the handset has been separated from the telephone apparatus body, whereby the communication information is communicated between the second telephone terminal and the communication means.

The control means may disconnect communication of an information signal with the second telephone apparatus based on an instruction signal that input through the user input means.

The telephone apparatus may be so constructed that it further comprises time detecting means for keeping time, and communication information detecting means for detecting whether the receiving means has received communication information from the second telephone apparatus, and that the control means disconnects communication of communication information between the telephone apparatus and the second telephone apparatus when no communication information is input from the second telephone apparatus to the communication information detecting means until the time detecting means detects a lapse of a predetermined period from a time point when the message information stored in the message storing means was transmitted from the transmitting means.

The control means may set the predetermined period based on an instruction signal that is input through the user input means.

The telephone apparatus may be so constructed that it further comprises communication storing means for storing communication information that is received by the receiving means, and that the control means causes the communication storing means to store communication information received by the receiving means based on an instruction signal that is input through the user input means.

The telephone apparatus may be so constructed that it further comprises remote control signal receiving means for receiving a command signal that is output from a remote control device, and that the control means executes a process corresponding to the command signal.

The telephone apparatus may be so constructed that it further comprises voice signal detecting means for detecting a voice signal indicating a prescribed command, and that the control means executes a process corresponding to the voice command.

The message information stored in the message storing means may be information for requesting a user of the second telephone apparatus to introduce himself.

DETAILED DESCRIPTION OF THE PREFERRED EMBODIMENT

A telephone terminal according to an embodiment of the present invention will be hereinafter described with reference to the accompanying drawings.

Figure 1:
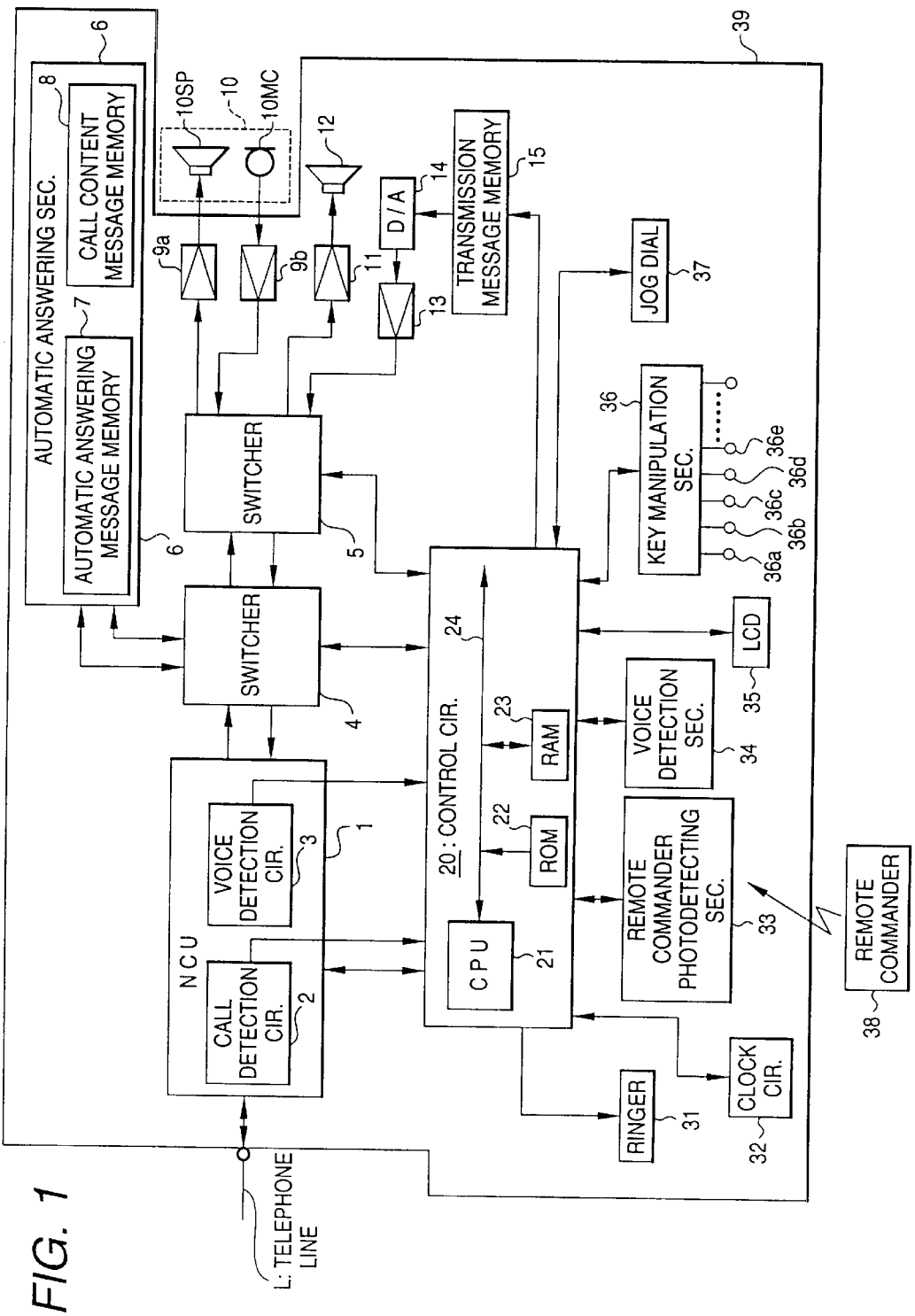
FIG. 1 is a block diagram showing the configuration of a telephone terminal according to an embodiment of the present invention.
Figure 2:
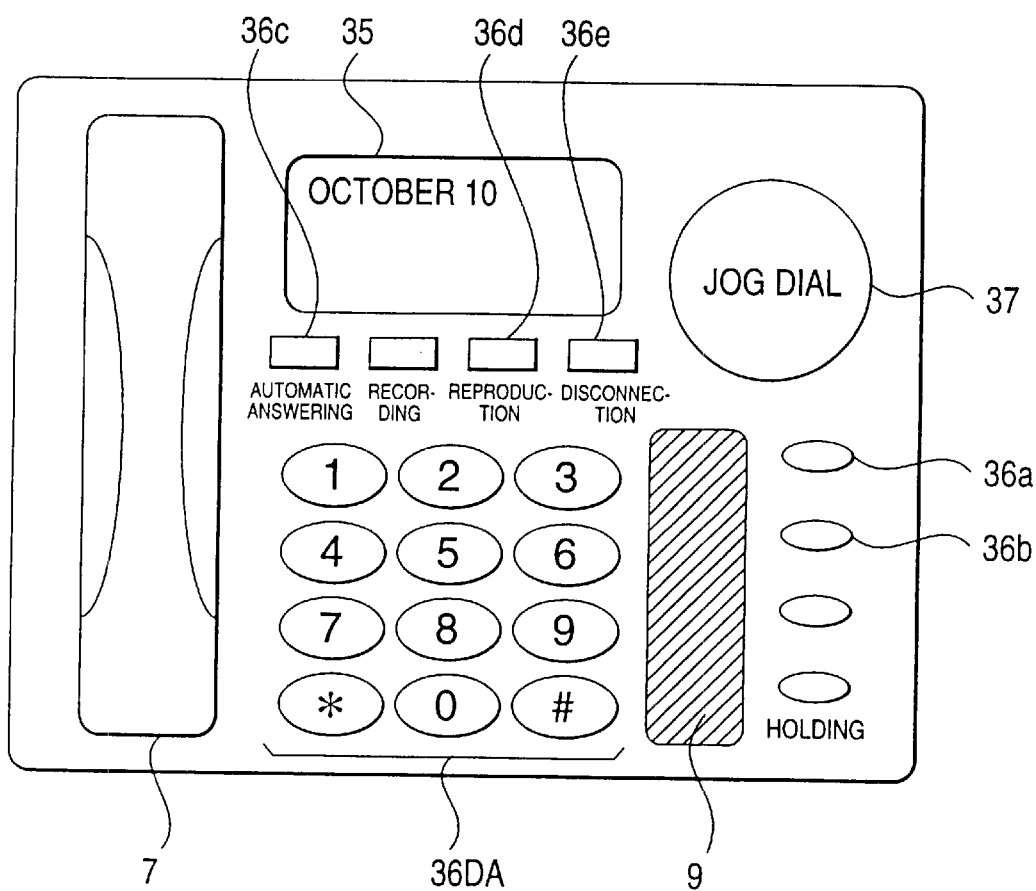
FIG. 2 shows an appearance of the telephone terminal according to the embodiment.

FIG. 1 is a block diagram showing the configuration of a telephone terminal according to the embodiment, and FIG. 2 shows its appearance. The telephone terminal of this embodiment is a home telephone terminal that is installed and used indoors. This telephone terminal is wire-connected, via a rosette, to a telephone line L that is led indoors from the outside.

As shown in FIG. 1, the telephone terminal of the embodiment is equipped with an NCU (network control unit) 1 incorporating a call detection circuit 2 and a voice detection circuit 3, switchers 4 and 5, an automatic answering section 6, amplification circuits 9a and 9b, a handset having a receiver 10SP and a transmitter 10MC, an amplification circuit 11, a speaker 12, an amplification circuit 13, a D/A conversion circuit 14, a transmission message memory 15, and a control circuit 20. Reference numeral 39 denotes a telephone apparatus body.

The control circuit 20, which is to control each section of the telephone terminal of the embodiment, is a microcomputer in which a CPU 21, a ROM 22, and a RAM 23 are connected to each other via a system bus 24. The ROM 22 stores various programs to be executed in the telephone terminal of the embodiment and data necessary for various kinds of processing. The RAM 23 is used as a work area in various kinds of processing.

As shown in FIG. 1, a ringer 31, a clock circuit 32, a remote commander photodetecting section 33, a voice detection section 34, an LCD (liquid crystal display) 35, a manipulation key section 36 having a number of manipulation keys, and a JOG dial 37 are connected to the control circuit 20.

The ringer 31 is to generate ringing tones etc. The clock circuit 32 provides the current time. Further, having a calendar function, the clock circuit 32 can perform date management. The remote commander photodetecting section 33 receives an infrared remote commander control signal coming from a remote commander 38 and converts it to an electrical signal, which is supplied to the control circuit 20. With the section 33, the telephone terminal of the embodiment allows the user to perform various manipulations such as a responding manipulation and an information setting manipulation also by using the remote commander 38.

The voice detection section 34 is to receive a voice or a handclap as instruction input information. The voice detection section 34 allows the user to respond to a call at the time of its arrival without directly manipulating the telephone terminal, by saying "yes" or clapping his hands, for example. As shown in FIG. 2, the LCD 35 has a relatively large display screen on which various kinds of information such as a date and time and a telephone number can be displayed.

As shown in FIG. 2, the key manipulation section 36, which is to receive a manipulation by the user, has various manipulation keys including a response key (tentative responding manipulation key) 36a, a communication key (true responding manipulation key) 36b, an automatic answering mode setting key 36c, a call content data reproduction key 36d, a disconnection key 36e, and dial keys 36DA.

The JOG dial 37 has two functions of a rotary key and a push-button key. For example, the JOG dial 37 enables the user to perform an item selecting operation on a menu by manipulating it as a rotary key. When the JOG dial is depressed as a push-button key, the manipulation is regarded as a decision input for a selected item.

Further, equipped with the automatic answering section 6, the telephone terminal of this embodiment has an automatic answering function. As shown in FIG. 1, the automatic answering section 6 incorporates an automatic answering message memory 7 storing an automatic answering notification message for notifying a caller of absence and a call content message memory 8 for storing a voice of a call content message from a caller, as well as a recording unit for storing a call content message from a caller in the call content message memory 8 and a reproducing unit for reproducing a call content message stored in the call content message memory 8.

The switcher 4 makes switching to connect the automatic answering section 6 and the NUC 1, to connect the NCU 1 and the switcher 5 to which the handset 10 etc. are connected, or to connect the automatic answering section 6 and the switcher 5 to reproduce a call content message stored in the call content message memory 8 of the automatic answering section 6. Switching-controlled by the control circuit 20, the switcher 4 connects the NCU 1 and the switcher 5 when the telephone terminal is not in an automatic answering mode, and connects the NCU 1 and the automatic answering section 6 when the telephone terminal is in an automatic answering mode. When a call content reproduction mode is set, the switcher 4 connects the automatic answering section 6 and the switcher 5.

As describes later, the telephone terminal of this embodiment is not of a type that immediately enables a communication through the handset 10 when the user performs a prescribed manipulation at the time of call arrival. Instead, the telephone terminal is so constructed as to be able to transmit a self-introduction request message (voice message) to a caller and receive a self-introduction voice signal from the caller.

The switcher 5 is provided for this purpose. As also described later, switching-controlled by the control circuit 20, the switcher 5 makes switching to connect the NCU 1 and the handset 10 to enable a communication or to make a connection to transmit a self-introduction request message and emit a self-introduction voice that is transmitted from a caller in response to the transmitted self-introduction request message.

In this embodiment, as also described later, when a prescribed manipulation for transmitting a self-introduction request message is performed (e.g., the response key 36a is depressed), the switcher 5 is so switched that a self-introduction request message is transmitted and a self-introduction voice that is transmitted from a caller in response to the transmitted self-introduction request message is emitted.

When the communication key 36b is depressed, the switcher 5 is so controlled as to connect the NCU 1 and the handset 10.

As shown in FIG. 1, the NCU 1 has the call detection circuit 2 and the voice detection circuit 3 for detecting whether a voice signal has been transmitted from a caller via a connected telephone circuit. Equipped with an off-hook/on-hook detection switch, a dialer, etc., the NCU 1 also performs a telephone circuit connection control.

For example, as for the call reception, when detecting call arrival with the call detection circuit 2, the NCU 1 informs the control circuit 20 of the call arrival. In response, the control circuit 20 controls the ringer 31 to have it emit ringing tones, to thereby inform the user of the telephone terminal of the call arrival.

If the user performs an off-hook manipulation, the NCU 1 makes a connection to the telephone circuit and establishes a communicable state to allow a communication with the caller.

If the user then performs an on-hook manipulation, the NCU 1 finishes the communicable state and disconnects the telephone circuit.

As for the call transmission, if the user performs an off-hook manipulation and then manipulates the dial keys 36DA of the key manipulation section 36, for example, the NCU 1 performs a control for connecting a telephone circuit to a destination party by generating a signal corresponding to the manipulation on the dial keys 36DA for calling the destination party and transmitting the signal.

In an ordinary mode, a voice signal that is transmitted from the other party via the telephone circuit connected by the NCU 1 is supplied to the receiver 10SP of the handset 10 and output therefrom as a voice.

A voice signal generated by the transmitter 10MC of the handset 10 by picking up a voice of the user is transmitted, via the NCU 1, to the telephone circuit connected by the NCU 1. As a result, the voice of the user of the telephone terminal of the embodiment is transmitted to the other party via the telephone circuit. In this manner, the telephone terminal of this embodiment can receive or make a call. In the telephone terminal of this embodiment, constituent features except the handset 10 are stored in the telephone apparatus body 39.

Processes Executed at the Time of Call Arrival

As described above, the telephone terminal of this embodiment is so constructed as to transmit a self-introduction request message (voice message) to a caller when the user performs a prescribed manipulation at the time of call arrival and as to receive a self-introduction voice signal from the caller.

When the prescribed manipulation is performed at the time of call arrival to transmit a self-introduction request message, no communication channel is formed between the handset 10 and the telephone circuit and a voice picked up by the transmitter 10MC of the handset 10 is not transmitted to the caller. Therefore, the user of the telephone terminal of the embodiment can judge whether the caller is a person whom the user should talk to by listening to a self-introduction voice of the caller.

As also described later, if the user of the telephone terminal of the embodiment judges that the caller is a person whom the user should talk to by listening to a self-introduction voice of the caller, the user renders the telephone terminal in a communicable state and performs a communication. If the user judges that the caller is a person whom the user does not want to talk to, the user renders the telephone terminal in an automatic answering mode and has the caller leave a call content message (voice message), which will be stored in the call content message memory 8.

If the user of the telephone terminal of the embodiment finds that the call is a sales or solicitation call by listening to a self-introduction voice of the caller, or if the user cannot identify the caller because of absence of a self-introduction, the user can cause the telephone terminal to disconnect the telephone circuit after transmitting a message to the effect that the telephone circuit will be disconnected.

As described above, in the telephone terminal of the embodiment, a process to be executed for a call can be selected at the time of its arrival after the caller is identified based on his self-introduction. Processes that are executed by the telephone terminal of the embodiment at the time of call arrival will be described below.

As described above, in the telephone terminal of the embodiment, when the call detection circuit 2 of the NCU 1 detects a call and the NCU 1 informs the control circuit 20 of the call arrival, the control circuit 20 controls the ringer 31 to have it emit ringing tones to notify the user of the call arrival.

If the user performs an off-hook manipulation corresponding to ringing tones by, for example, lifting up the handset 10, the control circuit 20 controls the NCU 1 to have it make a connection to the telephone circuit. Then, the control circuit 20 switches the switcher 4 so that the NCU 1 and the switcher 5 are connected to each other and switches the switcher 5 so that the NCU 1 and the handset 10 are connected to each other.

As a result, as described above, a communication channel is formed between the handset 10 and the calling side, whereby a communication with the caller becomes possible. In this case, a communication is enabled in a state that the user of the telephone terminal of the embodiment does not know who the caller is. Therefore, the user needs to identify the caller by directly asking the caller, for example.

On the other hand, if the user of the telephone terminal of the embodiment wants to answer a call from a friend, an acquaintance, a family member, or the like but does not want to answer a prank call or an undesirable sales or solicitation call, the user depresses the response key 36a of the key manipulation section 36 while the ringer 31 is emitting ringing tones.

If the response key 36a is depressed, the control circuit 20 controls the NCU 1 to have it make a connection to the telephone circuit and switches the switcher 5 so that the NCU 1 is connected to the speaker 12 and the transmission message memory 15 rather than immediately renders the telephone terminal communicable. In this case, since the telephone terminal is not rendered in an automatic answering mode, the switcher 4 is switched so that the NCU 1 and the switcher 5 are connected to each other, as described above. Therefore, when the response key 36a is depressed, a communication channel is formed between the calling-side telephone terminal and the speaker 12 and the transmission message memory 15.

The transmission message memory 15 stores a self-introduction request message for requesting a caller to send a self-introduction as well as, as also described later, a circuit disconnection message to be transmitted to a caller when the telephone terminal of the embodiment disconnects the telephone circuit to which a connection has been made by responding to the call.

In this embodiment, the self-introduction request message stored in the transmission message memory 15 is a message for requesting a caller to send a self-introduction, such as "A connection will not be made for your call unless you introduce yourself. Please let me have your name."

The control circuit 20 reads out the above self-introduction request message from the transmission message memory 15 and supplies it to the D/A conversion circuit 14. The D/A conversion circuit 14 converts the self-introduction request message to an analog signal. The self-introduction request message as converted to an analog signal is amplified by the amplification circuit 13 and supplied to the NCU 1 via the switchers 4 and 5.

The NCU 1 transmits the thus-processed self-introduction request message to the caller via the telephone circuit. The caller is thus given the self-introduction request message. The telephone terminal of this embodiment waits for a self-introduction voice from the caller.

As described above, if the response key 36a is depressed at the time of call arrival, the telephone terminal of the embodiment makes a connection to the telephone circuit but does not establish a communicable state immediately; the telephone terminal makes a tentative response and waits for a self-introduction from the caller. That is, the response key 36a has a function of receiving a tentative response instruction input.

If the caller transmits a self-introduction voice signal in response to the transmitted self-introduction request message, the self-introduction voice signal is supplied via the switchers 4 and 5 that are switched in the above-described manner to the amplification circuit 11. The self-introduction voice signal is amplified by the amplification circuit 11 and supplied to the speaker 12, whereby the self-introduction voice of the caller is emitted from the speaker 12.

As a result, the user of the telephone terminal of the embodiment can listen, before starting a communication, to a self-introduction of the caller such as "I'm Mr. ΦΦ." or "I'm Mr. ΦΦ of company ΓΓ."

After listening to the self-introduction of the caller, the user of the telephone terminal of the embodiment performs an off-hook manipulation by depressing the communication key 36b of the key manipulation section 36 or lifting up the handset 10 if he has judged that he needs to answer the call, that is, he needs to talk to the caller.

When an off-hook manipulation is made by depressing the communication key 36b or lifting up the handset 10, the control circuit 20 switches the switcher 5 so that the NCU 1 and the handset 10 are connected to each other. At this time, since as described above the switcher 4 is switched so as to connect the NCU 1 and the switcher 5, a communication channel is formed between the caller and the handset 10, to establish a state that the user of the telephone terminal of the embodiment can communicate with the caller via the handset 10.

In the telephone terminal of the embodiment, for example, a speaker and a microphone corresponding to the receiver 10SP and the transmitter 10MC are provided separately therefrom so that a voice of the caller can be emitted satisfactorily and a voice of the user can be picked up and transmitted to the caller satisfactorily even in a state that the handset 10 is placed down.

Therefore, when the communication key 36b is depressed, an off-hook state is established without lifting of the handset 10, whereupon a communication via the handset 10 that is left down becomes possible. An off-hook state is also established and a communication becomes possible when the handset 10 is lifted up. As seen from the above, the off-hook/on-hook detection switch, for example, for detecting whether the communication switch 36b has been depressed and whether the handset 10 has been lifted up has a function of receiving a true response instruction input.

For example, if the user of the telephone terminal of the embodiment, who has listened to a self-introduction of the caller, does not want to answer the call now though the caller is his acquaintance, the user depresses the automatic answering mode setting key 36c.

When the automatic answering mode setting key 36c is depressed, the control circuit 20 switches the switcher 4 so that the NCU 1 and the automatic answering section 6 are connected to each other and renders the telephone terminal in an automatic answering mode. Then, the control circuit 20 transmits, to the caller, via the switcher 4 and the NCU 1, an automatic answering notification message that is stored in the automatic answering message memory 7 of the automatic answering section 6 and serves to inform the caller of the user's absence and suggest the caller's leaving a call content message, to cause a call content message (voice message) of the caller to be stored in the call content message memory 8.

If a call content message is transmitted from the caller in response to the automatic answering notification message, it is supplied to the automatic answering section 6 via the NCU 1 and the switcher 4 and stored in the call content message memory 8. As such, the automatic answering mode setting key 36c has a function receiving an input as an instruction to make a transition to an automatic answering mode.

The user of the telephone terminal of the embodiment can reproduce and listen to, anytime, a call content message stored in the call content message memory 8 of the automatic answering section 6 by depressing the reproduction key 36d that is provided in the key manipulation section 36 of the telephone terminal. That is, if the reproduction key 36d is depressed after a call content message of the caller has been stored in the call content message memory 8 and the telephone circuit has been disconnected, the control circuit 20 switches the switcher 4 so that the automatic answering section 6 and the switcher 5 are connected to each other and switches the switcher 5 so that the switcher 4 and the speaker 12 are connected to each other.

Then, the control circuit 20 controls the automatic answering section 6 to have it reproduce the call content message stored in the call content message memory 8. As a result, the call content message stored in the call content message memory 8 is reproduced and supplied to the speaker 12 via the switchers 4 and 5 and the amplification circuit 11. The user of the telephone terminal of the embodiment can listen to the call content message that is emitted from the speaker 12.

If the user of the telephone terminal of the embodiment, who has listened to the self-introduction of the caller, has found that the caller is an undesired sales or solicitation call or a prank call, or if the user cannot identify the caller because the caller has not introduced himself, the user depresses the disconnection key 36e.

When the disconnection key 36e is depressed, the control circuit 20 reads out a circuit disconnection message stored in the transmission message memory 15 such as "I'm sorry I cannot make a connection for your call." and sends it to the caller. That is, as in the case of the above-described self-introduction request message, the circuit disconnection message is output to the telephone circuit via the D/A conversion circuit 14, the amplification circuit 13, the switchers 5 and 4, and the NCU 1 and transmitted to the caller.

After transmitting the circuit disconnection message, the control circuit 20 controls the NCU 1 to have it disconnect the telephone circuit. With the above operation, when the user of the telephone terminal has found that the call is an undesired sales or solicitation call or a prank call or when he cannot identify the caller, he can disconnect the telephone circuit rather than communicates with the caller by performing a true responding manipulation for the call. That is, the disconnection key 36e has a function of receiving a circuit disconnection instruction input.

After transmitting a self-introduction request message, the telephone terminal of the embodiment monitors whether a self-introduction has been transmitted from the caller within a predetermined period. If it is judged that no self-introduction has been transmitted within the predetermined period, the telephone terminal transmits a circuit disconnection message and disconnects the telephone circuit as in the above-described case where the disconnection key 36e is depressed.

Specifically, as described above, having the voice detection circuit 3 (in the NCU 1), the telephone terminal of the embodiment detects, with the voice detection circuit 3, a voice signal that is transmitted from a caller. When detecting a voice signal that is transmitted from a caller, the voice detection circuit 3 informs the control circuit 20 of the reception of the voice signal.

The control circuit 20 acquires, from the clock circuit 32, the time when a self-introduction request message was transmitted to a caller and monitors the current time of the clock circuit 32. If no voice signal has been transmitted from the caller within the predetermined period, for example, several seconds to tens of seconds, it is judged that no self-introduction has been transmitted from the caller.

If the control circuit 20 judges that no self-introduction has been made within the predetermined period from the transmission of the self-introduction message, the control circuit 20 causes a circuit disconnection message stored in the transmission message memory 15 to be transmitted to the caller and controls the NCU 1 to disconnect the telephone circuit.

The telephone terminal of the embodiment is so constructed that if, for example, the caller disconnects the telephone circuit after a tentative response was made and a self-introduction request message was transmitted, the NCU 1 detects the disconnection of the telephone circuit and then disconnects the circuit, whereby an on-hook state can be restored.

In the telephone terminal of the embodiment, a plurality of, different self-introduction request messages and circuit disconnection messages are stored in the ROM 22 in advance. A desired one of the messages stored in the ROM 22 can be selected and stored in the transmission message memory 15.

Further, the telephone terminal of the embodiment has a function of allowing the user to register a desired message of his own voice in the transmission message memory 15. Therefore, the user can use a message created by himself instead of a message prepared in the telephone terminal.

In this case, in the telephone terminal of the embodiment, although not shown in any drawing, a voice picked up through a message pickup microphone that is provided in the telephone terminal can be stored in the transmission message memory 15. Alternatively, in the telephone terminal of the embodiment, a voice picked by the transmitter 10MC of the handset 10 can be stored in the transmission message memory 15 by connecting the transmitter 10MC to the transmission message memory 15 via the switcher 5.

Figure 3:
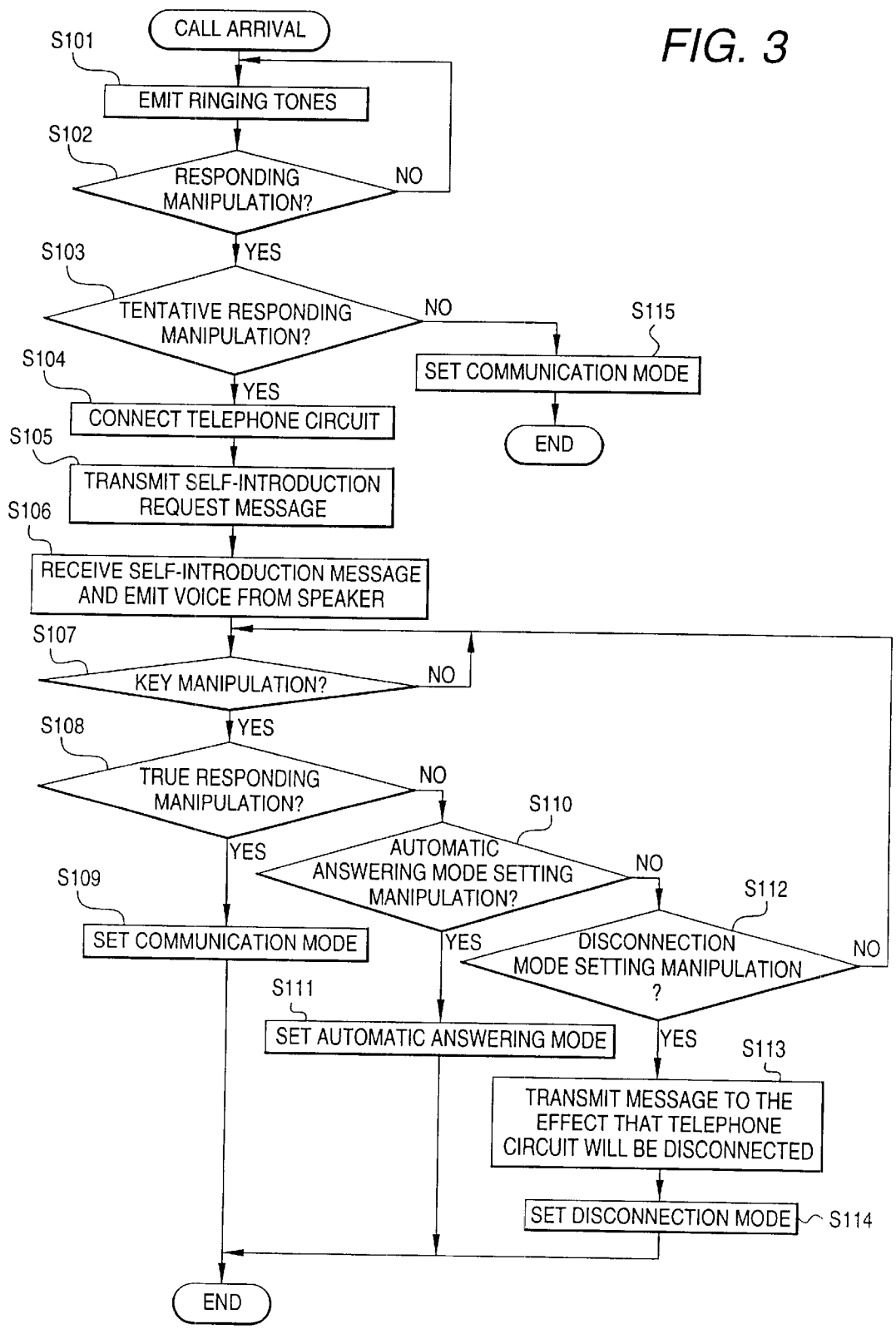
FIG. 3 is a flowchart showing a process that is executed by the telephone terminal of the embodiment at the time of call arrival.

Next, the process that is executed by the telephone terminal of the embodiment at the time of call arrival will be described with reference to a flowchart of FIG. 3.

As described above, when call arrival is detected by the call detection circuit 2 of the NCU 1, the control circuit 20 is informed of the call arrival and controls the ringer 31 to have it emit ringing tones for notifying the user of the call arrival (step S101).

At step S102, the control circuit 20 judges whether a responding manipulation has been performed by the user. The judgment process of step S102 is a process for judging whether either a tentative responding manipulation or a true responding manipulation has been performed. The tentative responding manipulation is a depression manipulation on the response key 36a, a responding manipulation through the remote commander 38, or a responding manipulation by voice or handclapping. The true responding manipulation is an off-hook manipulation such as a depression manipulation on the communication key 36b or lifting of the handset 10.

If judging at step S102 that a responding manipulation has been performed, the control circuit 20 judges at step S103 whether the responding manipulation is a tentative one. If judging at step S103 that the responding manipulation is a true one rather than a tentative one, at step S115, as described above, the control circuit 20 forms a communication channel between the handset 10 and the caller by connecting the handset 10 to the telephone circuit by controlling the switcher 5 and renders the telephone terminal of the embodiment in a communication mode, to thereby enable a communication with the caller.

If judging at step S103 that the responding manipulation is a tentative one, at step S104 the control circuit 20 makes a connection to the telephone circuit by controlling the NCU 1. At step S105, as described above, the control circuit 20 controls the switchers 4 and 5 so that the speaker 12 and the transmission message memory 15 are connected to the telephone circuit and transmits a self-introduction request message that is stored in the transmission message memory 15 to the caller. At step S106, the control circuit 20 causes the telephone terminal to receive a self-introduction voice of the caller and emits it from the speaker 12.

At step S107, the control circuit 20 judges whether the user has performed a key manipulation. If judging that the user has performed a key manipulation, the control circuit 20 judges at step S108 whether the key manipulation is a true responding manipulation.

If judging at step S108 that the key manipulation is a true responding manipulation, at step S109 the control circuit 20 forms a communication channel between the handset 10 and the caller and renders the telephone terminal of the embodiment in a communication mode in the same manner as at step S115, to thereby enable a communication with the caller.

If judging at step S108 that the key manipulation is not a true responding manipulation, the control circuit 20 judges at step S110 whether the key manipulation that was performed by the user is an automatic answering mode setting manipulation of depressing the automatic answering mode setting key 36c.

If judging at step S110 that the key manipulation is an automatic answering mode, at step S111, as described above, the control circuit 20 renders the telephone terminal of the embodiment in an automatic answering mode by connecting the automatic answering section 6 to the telephone circuit by controlling the switcher 4. The control circuit 20 causes the telephone terminal to transmit an automatic answering message to the caller and store a call content message from the caller in the call content message memory 8. Then, if detecting, for example, that the caller has disconnected the telephone circuit or that a predetermined time has elapsed, the control circuit 20 causes the telephone terminal of the embodiment to disconnect the telephone circuit and return to an on-hook state.

If judging at step S110 that the key manipulation that was performed by the user is not an automatic answering mode setting manipulation, the control circuit 20 judges at step S112 whether the key manipulation is a disconnection mode setting manipulation of depressing the disconnection key 36e.

If judging at step S112 that the key manipulation is a disconnection mode setting manipulation, the control circuit 20 causes the telephone terminal to transmit a circuit disconnection message that is stored in the transmission message memory 15 to the caller at step S113 and renders the telephone terminal in a disconnection mode at step S114. When the disconnection mode is set, the control circuit 20 controls the NCU 1 to have it disconnect the telephone circuit.

If judging at step S112 that the key manipulation is not a disconnection mode setting manipulation, the control circuit 20 repeats step S107 and the following steps. That is, if the key manipulation that was performed by the user is not any of a true responding manipulation, an automatic answering mode setting manipulation, and a disconnection mode setting manipulation, the key manipulation is disregarded and step S107 and the following steps are repeated.

As described above, the telephone terminal of the embodiment is so constructed that a circuit disconnection message is transmitted to the caller, a disconnection mode is set, and the telephone circuit is disconnected also when the caller has not introduced himself within a predetermined period from the time point when a self-introduction request message was transmitted to the caller and the user of the telephone terminal of the embodiment has not performed any of a true responding manipulation, an automatic answering mode setting manipulation, and a disconnection mode setting manipulation.

The telephone terminal of the embodiment is so constructed that the predetermined period for which the control circuit 20 should wait from the transmission of a self-introduction request message can be set by the user arbitrarily. Specifically, a period that can be set in the RAM 23 of the control circuit 20 by manipulating a time setting key of the key manipulating section 36 and used for the above purpose.

If the caller disconnects the telephone circuit after the transmission of a self-introduction request message, the telephone terminal of the embodiment can return to an on-hook state detecting the disconnection of the telephone circuit and then being controlled by the control circuit 20.

As described above, if the user performs a predetermined manipulation to effect a tentative response at the time of call arrival, the telephone terminal according to the embodiment can request the caller to introduce himself by transmitting a self-introduction request message to the caller. By listening to a self-introduction that is transmitted from the caller instead of directly talking to him, the user of the telephone terminal of the embodiment can identify the caller and select among communicating the caller, setting an automatic answering mode, and disconnecting the telephone circuit.

That is, by listening to a voice of the caller as a self-introduction, the user himself of the telephone terminal of the embodiment can select a process to be executed for the arrival call after recognizing who the caller is, that is, whether the caller is a person whom the user wants to communicate with, a person whom the user does not want to directly talk to as in a case where the call is an undesired sales or solicitation call, or a person who is making a silent call or a prank call.

Therefore, the user of the telephone terminal of the embodiment can deal with, in completely different manners, calls to answer by himself and annoying calls such as an undesired sales or solicitation call and a silent or prank call.

In the telephone terminal of the embodiment, as described above, if the user depresses the automatic answering mode setting key 36c after making a tentative response, the telephone terminal is rendered in an automatic answering mode, an automatic answering notification message is transmitted via the telephone circuit connected thereto, and then a call content message is received and stored.

However, having the automatic answering section 6, the telephone terminal according to the embodiment can naturally be provided with an automatic call reception type automatic answering mode in which at the time of call arrival an automatic answering notification message is transmitted and a call content message is received and stored.

Figure 4:
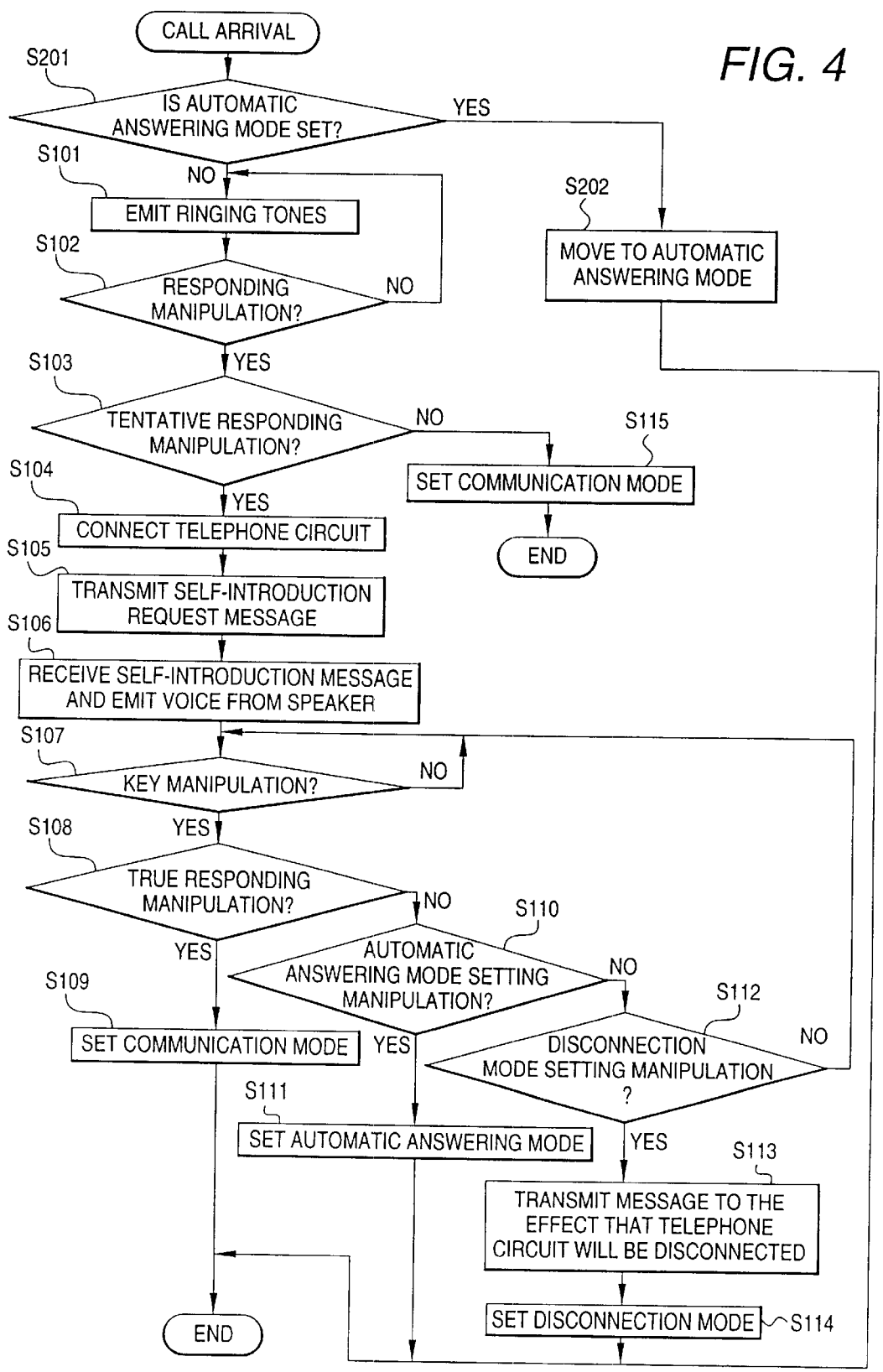
FIG. 4 is a flowchart showing another process that is executed by the telephone terminal of the embodiment at the time of call arrival.

FIG. 4 is a flowchart showing a process that is executed at the time of call arrival in a case where the telephone terminal of the embodiment is provided with an automatic call reception type automatic answering mode.

If the user of the telephone terminal of the embodiment depresses the automatic answering mode setting key 36c of the key manipulation section 36 when, for example, he goes out, the control circuit 20 is informed of the depression of the automatic answering mode setting key 36c. Recognizing the fact that an automatic answering mode has been set, the control circuit 20 stores it in the RAM 23, for example.

When the call detection circuit 2 of the NCU 1 detects a call and the control circuit 20 is informed of the call arrival, first, at step S201, the control circuit 20 refers to the information indicating the current mode of the telephone terminal that is stored in the RAM 23 and judges whether an automatic answering mode is set.

If judging at step S201 that an automatic answering mode is set, at step S202 the control circuit 20 controls the NCU 1 to automatically respond to the call and switches the switcher 4 so that the automatic answering section 6 is connected to the telephone circuit, whereby the telephone terminal comes to operate in an automatic answering mode.

If judging at step S201 that an automatic answering mode is not set, the control circuit 20 executes steps S101–S115 described above in connection with FIG. 3.

As described above, by setting an automatic call reception type automatic answering mode in advance, the telephone terminal of the embodiment can automatically respond to a call, transmit an automatic answering notification message, and store a call content message from a caller in the call content message memory 8.

In the case where the telephone terminal of the embodiment is provided with the automatic call reception type automatic answering mode, as described above, by utilizing the automatic answering function, it is possible to identify a caller based on a call content message from the caller and, if the caller is a person whom the user wants to talk to, communicate with the caller by switching from the automatic answering mode to a communication mode by lifting up the handset 10, for example.

In the telephone terminal according to the embodiment, a self-introduction request message is transmitted and a self-introduction voice is received and emitted when the user recognizes call arrival and performs a tentative responding manipulation in contrast to the case where the user identifies a caller based on a call content message from the caller by utilizing the automatic answering function. Therefore, there does not occur an event that the user fails to hear a self-introduction or transition to a communication mode is delayed.

Therefore, the user of the telephone terminal of the embodiment can not only identify a caller without failing to listen to a self-introduction of the caller but also start communicating with the caller by immediately establishing a communication mode if the user judges that he needs to talk to the caller.

Although in the above embodiment a voice self-introduction request message is transmitted to a caller, the invention is not limited to such a case. For example, where the telephone terminal of a caller is equipped with a display device, it is possible to request a self-introduction by transmitting a text message to the caller.

Naturally it is possible to transmit both of a voice self-introduction request message and a text self-introduction request message to a caller.

As described above, according to the telephone terminal of the invention, when the user of the telephone terminal recognizes call arrival and inputs a tentative response instruction, the telephone terminal requests the caller to introduce himself. Therefore, the user does not fail to listen to a self-introduction of the caller. Since the user can identify the caller by listening to a self-introduction that is transmitted from the calling side in response to a self-introduction request message, he can avoid talking to the caller if the call is an annoying call such as a prank or wrong-number call or an undesired sales or solicitation call. That is, the user side that is a receiving side of annoying calls can surely be prevented from answering to annoying calls.

If the user has found that the caller is a person whom the user wants to talk to by listening to a self-introduction call that is transmitted from the caller in response to a self-introduction request message, he inputs a true response instruction, whereupon a communication channel is formed immediately and a communication with the caller is enabled.

If the user has found that the caller is a person whom the user does not want to talk to by listening to a self-introduction call that is transmitted from the caller in response to a self-introduction request message, he inputs a transition instruction, whereupon a transition to an automatic answering mode is made and a call content message from the call can be stored.

If the caller does not introduce himself and no self-introduction voice signal is transmitted from the caller side in spite of the transmission of a self-introduction request message, or if it has been found that the call is an undesired sales or solicitation call, the user inputs a circuit disconnection instruction, whereupon the telephone circuit is disconnected. Therefore, the telephone circuit can be disconnected without the user's talking to the caller who has not introduced himself.

Even if the user does not input a circuit disconnection input, the telephone circuit can be disconnected if no self-introduction is transmitted from the calling side within a predetermined period from the transmission of a self-introduction request message. Therefore, answering to annoying calls such as a silent call can surely be prevented.

The waiting time from the transmission of a self-introduction request message to the reception of a self-introduction from a caller can be set in each telephone terminal in accordance with the manner of arrival of calls. For example, the waiting time may be set relatively shorter in a case where prank calls arrive frequently. Answering to annoying calls can thus be prevented effectively.

In the telephone terminal according to the invention the user can input a tentative response instruction by using any of a plurality of input means. Therefore, the user can surely request a caller to introduce himself by transmitting a self-introduction request message to the caller, whereby the user side that is a receiving side of annoying calls can surely be prevented from answering to annoying calls.

In the telephone terminal according to the invention the user can input a true response instruction by using any of a plurality of input means. Therefore, if the caller is a person whom the user should communicate with, a communication can be started surely and quickly.

What is claimed is:

1. A telephone apparatus for communicating an information signal via a communication network, the telephone apparatus comprising:
    a telephone apparatus body;
    a handset;
    receiving means for receiving a first information signal;
    reception informing means for informing a user of reception of connection demanding information when the receiving means receives the connection demanding information from a second telephone apparatus as the first information signal;
    transmitting means for transmitting a second information signal;
    storing means for storing message information;
    user input means for allowing the user to input an instruct signal;
    control means for controlling the transmitting means to transmit, as the second information signal, the message information stored in the storing means to the second telephone apparatus in accordance with the instruct signal that is input through the user input means when the informing means informs the user of the reception of the connection demanding information;
    communication means through which communication information is communicated to the second telephone apparatus; and
    a switcher for switching the telephone apparatus among a not-automatic answering mode, an automatic answering mode, and a call content reproduction mode;
    wherein at least the receiving means, the transmitting means, and the control means are accommodated in the telephone apparatus body and the communication means is provided in the handset.

2. A telephone apparatus according to claim 1, wherein the receiving means receives the connection demanding information and the communication information from said second telephone apparatus as the first information signal, and wherein the transmitting means transmits at least the message information as the second information signal.

3. A telephone apparatus according to claim 2, wherein the control means controls the receiving means, the transmitting means, and the communication means based on the instruct signal that has been input by the user, whereby the communication information is communicated between the second telephone terminal and the communication means.

4. A telephone apparatus according to claim 3, wherein the control means controls the receiving means, the transmitting means, and the communication means when detecting that the handset has been separated from the telephone apparatus body, whereby the communication information is communicated between the second telephone terminal and the communication means.

5. A telephone apparatus according to claim 1, wherein the control means disconnects communication of the connection demanding information from the second telephone apparatus based on an instruct signal that is input through the user input means.

6. A telephone apparatus according to claim 1, further comprising communication storing means for storing communication information that is received through the communication means, wherein the control means causes the communication storing means to store the communication information received through the communication means based on an instruct signal that is input through the user input means.

7. A telephone apparatus according to claim 1, further comprising remote control signal receiving means for receiving a command signal that is output from a remote control device, wherein the control means executes a process corresponding to the command signal.

8. A telephone apparatus according to claim 1, further comprising voice signal detecting means for detecting a voice signal indicating a prescribed command, wherein the control means executes a process corresponding to the voice command.

9. A telephone apparatus according to claim 1, wherein the message information stored in the message storing means is information for requesting a user of the second telephone apparatus to introduce himself.

10. A telephone apparatus for communicating an information signal via a communication network, the telephone apparatus comprising:

receiving means for receiving a first information signal;

reception informing means for informing a user of reception of connection demanding information when the receiving means receives the connection demanding information from a second telephone apparatus as the first information signal;

transmitting means for transmitting a second information signal;

storing means for storing message information;

user input means for allowing the user to input an instruct signal;

control means for controlling the transmitting means to transmit, as the second information signal, the message information stored in the storing means to the second telephone apparatus in accordance with the instruct signal that is input through the user input means when the informing means informs the user of the reception of the connection demanding information;

time detecting means for detecting time; and communication information detecting means for detecting whether the receiving means has received communication information as the first information signal from the second telephone apparatus, wherein the control means disconnects communication between the telephone apparatus and the second telephone apparatus when the communication information detecting means detects no communication information within a predetermined period detected by the time detecting means from a time point when the message information stored in the storing means was transmitted from the transmitting means.

11. A telephone apparatus according to claim 10, wherein the control means sets the predetermined period based on an instruct signal that is input through the user input means.

12. A telephone apparatus according to claim 9, further comprising communication storing means for storing communication information that is received through the communication means, wherein the control means causes the communication storing means to store the communication information received through the communication means based on an instruct signal that is input through the user input means.

13. A telephone apparatus according to claim 10, further comprising remote control signal receiving means for receiving a command signal that is output from a remote control device, wherein the control means executes a process corresponding to the command signal.

14. A telephone apparatus according to claim 10, further comprising voice signal detecting means for detecting a voice signal indicating a prescribed command, wherein the control means executes a process corresponding to the voice command.

15. A telephone apparatus according to claim 10, wherein the message information stored in the message storing means is information for requesting a user of the second telephone apparatus to introduce himself.

* * * * *